US011455812B2

(12) United States Patent
Yuan et al.

(10) Patent No.: US 11,455,812 B2
(45) Date of Patent: Sep. 27, 2022

(54) EXTRACTING NON-TEXTUAL DATA FROM DOCUMENTS VIA MACHINE LEARNING

(71) Applicant: International Business Machines Corporation, Armonk, NY (US)

(72) Inventors: Zhong Fang Yuan, Xi'an (CN); Guang Qing Zhong, Beijing (CN); Tong Liu, Xi'an (CN); De Shuo Kong, Beijing (CN); Yi Ming Wang, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 319 days.

(21) Appl. No.: 16/818,311

(22) Filed: Mar. 13, 2020

(65) Prior Publication Data

US 2021/0286993 A1 Sep. 16, 2021

(51) Int. Cl.
*G06V 30/414* (2022.01)
*G06K 9/62* (2022.01)
*G06N 20/00* (2019.01)

(52) U.S. Cl.
CPC ......... *G06V 30/414* (2022.01); *G06K 9/6218* (2013.01); *G06N 20/00* (2019.01)

(58) Field of Classification Search
CPC .... G06V 30/414; G06V 10/44; G06K 9/6218; G06K 9/6215; G06K 9/622; G06N 20/00
See application file for complete search history.

(56) References Cited

U.S. PATENT DOCUMENTS

| 7,050,630 | B2 | 5/2006 | Simske |
| 7,646,921 | B2* | 1/2010 | Vincent ............... G06V 30/414 |
| | | | 382/321 |
| 10,013,488 | B1* | 7/2018 | Zhao .................. G06F 16/7335 |
| 11,106,716 | B2* | 8/2021 | Bhowan .............. G06V 10/454 |
| 11,216,659 | B2* | 1/2022 | Srinivas .............. G06V 30/414 |
| 2004/0024756 | A1 | 2/2004 | Rickard |
| 2004/0034633 | A1 | 2/2004 | Rickard |
| 2011/0185273 | A1 | 7/2011 | Dacosta |
| 2011/0249905 | A1 | 10/2011 | Singh |

(Continued)

OTHER PUBLICATIONS

Jung et al., "Chartsense: Interactive Data Extraction From Chart Images", CHI 2017, May 6-11, 2017, Denver, CO, USA, ACM 978-1-4503-4655-9/17/05, 12 pages, DOI: http://dx.doi.org/10.1145/3025453.3025957.

(Continued)

*Primary Examiner* — Phuoc Tran
(74) *Attorney, Agent, or Firm* — Monchai Chuaychoo (57) ABSTRACT

An approach for extracting non-textual data from an electronic document is disclosed. The approach includes receiving a request to extract a file and converting the file into pixels. The approach creates a pixel map of the converted file and determines one or more density clusters of the pixel map based on image clustering method. Furthermore, the approach determines one or more coordinates of the one or more density clusters and determines one or more candidate information regions based on the one or more coordinates, density of the one or more density clusters. Finally, the approach extracts one or more textual data based on the one or more candidate information regions and outputs the extracted one or more textual data.

17 Claims, 7 Drawing Sheets

(56) References Cited

U.S. PATENT DOCUMENTS

2012/0213429 A1    8/2012   Vasudevan
2019/0171704 A1    6/2019   Buisson

OTHER PUBLICATIONS

Kanimozhi et al., "Unstructured Data Analysis—A Survey", International Journal of Advanced Research in Computer and Communication Engineering, vol. 4, Issue 3, Mar. 2015, DOI 10.17148/IJARCCE.2015.4354, 3 pages.

* cited by examiner

EXTRACTING NON-TEXTUAL DATA FROM DOCUMENTS VIA MACHINE LEARNING

BACKGROUND

The present invention relates generally to the field of digital document processing and more particularly to extracting non-textual data based on machine learning.

Electronic documents are ubiquitous in organizations, commercial and home use. These documents may contain textual data and non-textual data (e.g., flow charts, tables, UML, statistical charts, etc.). Sometimes, there is a need to extract these non-textual data from the areas containing those non-textual data. There have been several techniques have been developed for analyzing images and extracting the textual information from images (e.g., OCR, etc.).

SUMMARY

Aspects of the present invention disclose a computer-implemented method, computer program product, and computer system for extracting non-textual data from an electronic document. The computer implemented method includes: receiving a request to extract a file; converting the file into pixels; creating a pixel map of the converted file; determining one or more density clusters of the pixel map based on image clustering method; determining one or more coordinates of the one or more density clusters; determining one or more candidate information regions based on the one or more coordinates, density of the one or more density clusters; extracting one or more textual data based on the one or more candidate information regions; and outputting the extracted one or more textual data.

In another embodiment, the computer program product includes one or more computer readable storage media and program instructions stored on the one or more computer readable storage media, the program instructions comprising: program instructions to receive a request to extract a file; program instructions to converting the file into pixels; program instructions to create a pixel map of the converted file; program instructions to determine one or more density clusters of the pixel map based on image clustering method; program instructions to determine one or more coordinates of the one or more density clusters; program instructions to determine one or more candidate information regions based on the one or more coordinates, density of the one or more density clusters; program instructions to extract one or more textual data based on the one or more candidate information regions; and program instructions to output the extracted one or more textual data.

In another embodiment, the computer system includes one or more computer processors; one or more computer readable storage media; program instructions stored on the one or more computer readable storage media for execution by at least one of the one or more computer processors, the program instructions comprising: one or more computer processors; one or more computer readable storage media; program instructions stored on the one or more computer readable storage media for execution by at least one of the one or more computer processors, the program instructions comprising: program instructions to receive a request to extract a file; program instructions to converting the file into pixels; program instructions to create a pixel map of the converted file; program instructions to determine one or more density clusters of the pixel map based on image clustering method; program instructions to determine one or more coordinates of the one or more density clusters; program instructions to determine one or more candidate information regions based on the one or more coordinates, density of the one or more density clusters; program instructions to extract one or more textual data based on the one or more candidate information regions; and program instructions to output the extracted one or more textual data.

DETAILED DESCRIPTION

Embodiments of the present invention provides an approach to extracting non-textual data (e.g., tables, flow-charts, UML diagrams, etc.) from documents (e.g., web pages, word documents and pdf documents) by leveraging image clustering technology. For example, an embodiment of the approach may convert the document into pixels and create a pixel density map. Then, the pixel density map is further analyzed by the approach to reduce the textual noise data (not occupying many regions not useful for extraction) into a cluster of coordinates. Furthermore, the approach can target one or more of the cluster of pixels and/or coordinates that may contain information/regional areas that can be converted into text. Thus, the targeted extraction of the useful regional areas is carried out in a methodical manner to produce a textual representation.

Embodiments of the present invention may include one or more of the following features, characteristics, and/or advantages with extracting textual data: i) unaffected by location of structure data and ii) accurate data extraction in a noisy environment. Furthermore, the embodiment leverages unsupervised machine learning which does not required many, if any tagging.

A detailed description of embodiments of the claimed structures and methods are disclosed herein; however, it is to be understood that the disclosed embodiments are merely illustrative of the claimed structures and methods that may be embodied in various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods and structures of the present disclosure.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

Figure 1:
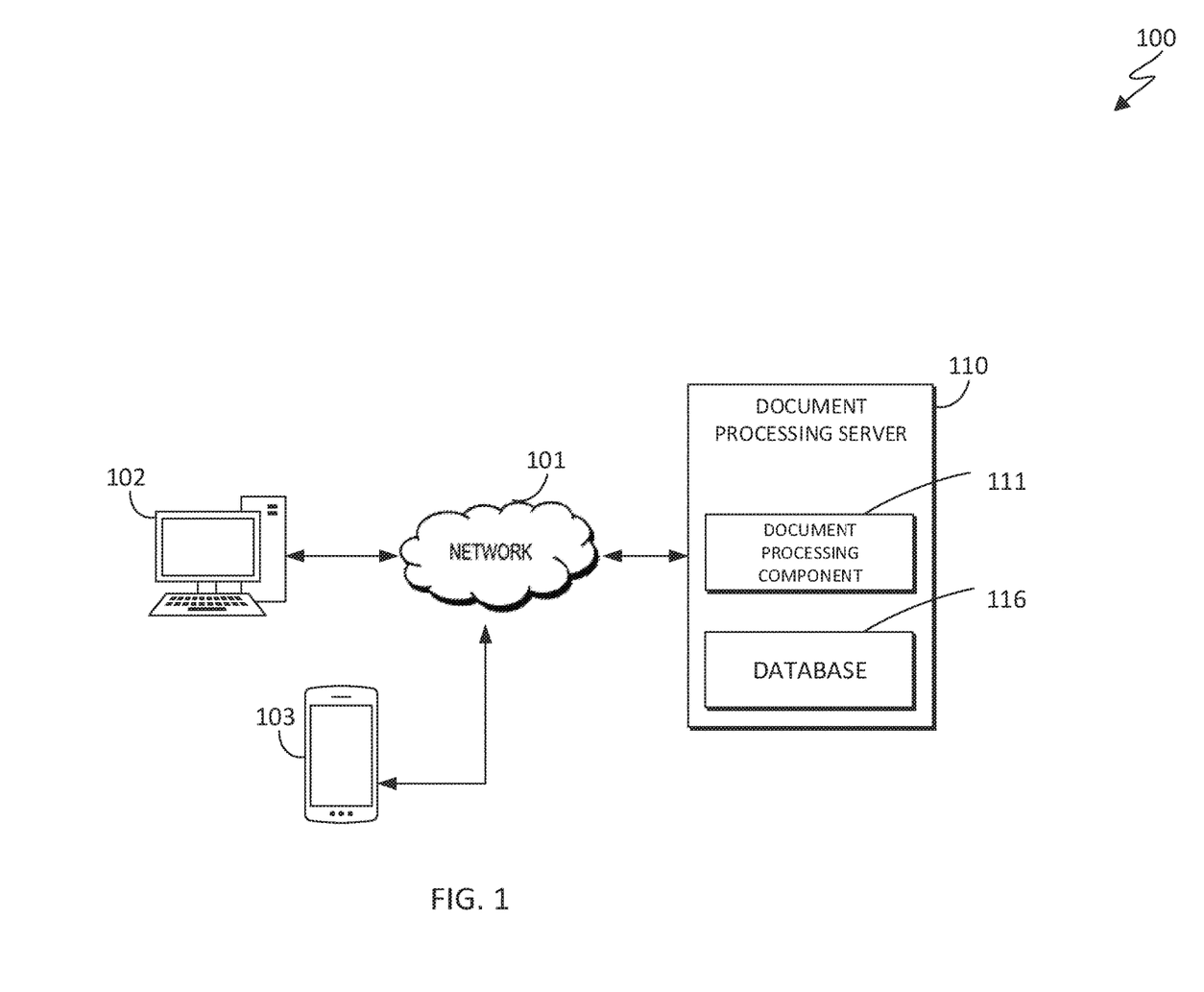
FIG. 1 is a functional block diagram illustrating a topology of a document processing environment, designated as 100, in accordance with an embodiment of the present invention.

FIG. 1 is a functional block diagram illustrating a topology of a document processing environment, designated as 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Document processing environment 100 includes client computing device 102, mobile computing device 103 and document server 110. All (e.g., 102 and 110) elements can be interconnected over network 101.

Network 101 can be, for example, a telecommunications network, a local area network (LAN), a wide area network (WAN), such as the Internet, or a combination of the three, and can include wired, wireless, or fiber optic connections. Network 101 can include one or more wired and/or wireless networks that are capable of receiving and transmitting data, voice, and/or video signals, including multimedia signals that include voice, data, and video information. In general, network 101 can be any combination of connections and protocols that can support communications between document server 110 and other computing devices (not shown) within document processing environment 100. It is noted that other computing devices can include, but is not limited to, client computing device 102 and any electromechanical devices capable of carrying out a series of computing instructions.

Client computing device 102 represents a network capable mobile computing device that may receive and transmit confidential data over a wireless network. Mobile computing device 102 can be a laptop computer, tablet computer, netbook computer, personal computer (PC), a personal digital assistant (PDA), a smart phone, smart watch (with GPS location) or any programmable electronic device capable of communicating with server computers (e.g., document server 110) via network 101, in accordance with an embodiment of the present invention.

Mobile computing device 103 represents a network capable mobile computing device that may receive and transmit confidential data over a wireless network. Mobile computing device 103 can be a laptop computer, tablet computer, netbook computer, personal computer (PC), a personal digital assistant (PDA), a smart phone, smart watch (with GPS location) or any programmable electronic device capable of communicating with server computers (e.g., document server 110) via network 101, in accordance with an embodiment of the present invention.

Document server 110 can be a standalone computing device, a management server, a web server, a mobile computing device, or any other electronic device or computing system capable of receiving, sending, and processing data. In other embodiments, document server 110 can represent a server computing system utilizing multiple computers as a server system, such as in a cloud computing environment. In another embodiment, document server 110 can be a laptop computer, a tablet computer, a netbook computer, a personal computer (PC), a desktop computer, a personal digital assistant (PDA), a smart phone, or any other programmable electronic device capable of communicating other computing devices (not shown) within 100 via network 101. In another embodiment, document server 110 represents a computing system utilizing clustered computers and components (e.g., database server computers, application server computers, etc.) that act as a single pool of seamless resources when accessed within document processing environment 100.

Document server 110 includes document processing component 111 and database 116.

Document processing component 111 enables the present invention to extract non-textual data from documents. Document processing component 111 will be described in greater details in regard to FIG. 2A.

Database 116 is a repository for data used by document processing component 111. Database 116 can be implemented with any type of storage device capable of storing data and configuration files that can be accessed and utilized by document server 110, such as a database server, a hard disk drive, or a flash memory. Database 116 uses one or more of a plurality of techniques known in the art to store a plurality of information. In the depicted embodiment, database 116 resides on document server 110. In another embodiment, database 116 may reside elsewhere within document processing environment 100, provided that document processing component 111 has access to database 116. Database 116 may store information associated with, but is not limited to, corpus knowledge of image clustering techniques, pixel density distribution map and OCR techniques.

Figure 2A:
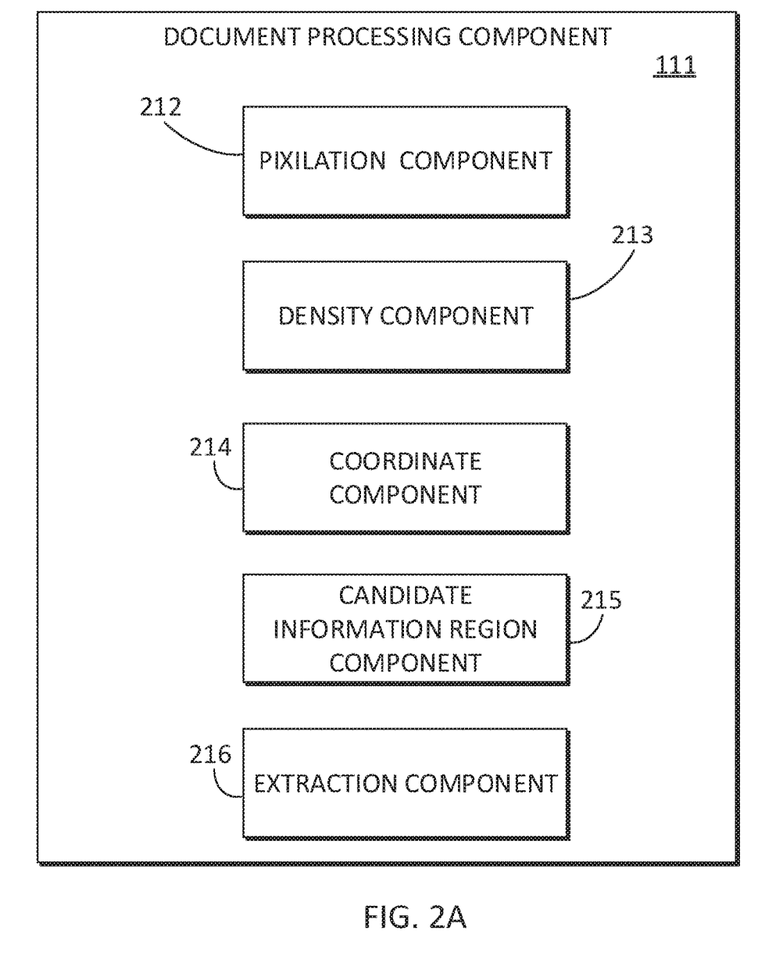
FIG. 2A is a functional block diagram illustrating document processing component in accordance with an embodiment of the present invention.

FIG. 2A is a functional block diagram illustrating document processing component 111 in accordance with an embodiment of the present invention. In the depicted embodiment, document processing component 111 includes pixilation component 212, density component 213, coordinate component 214, candidate information region component 215 and extraction component 216.

Figure 2B:
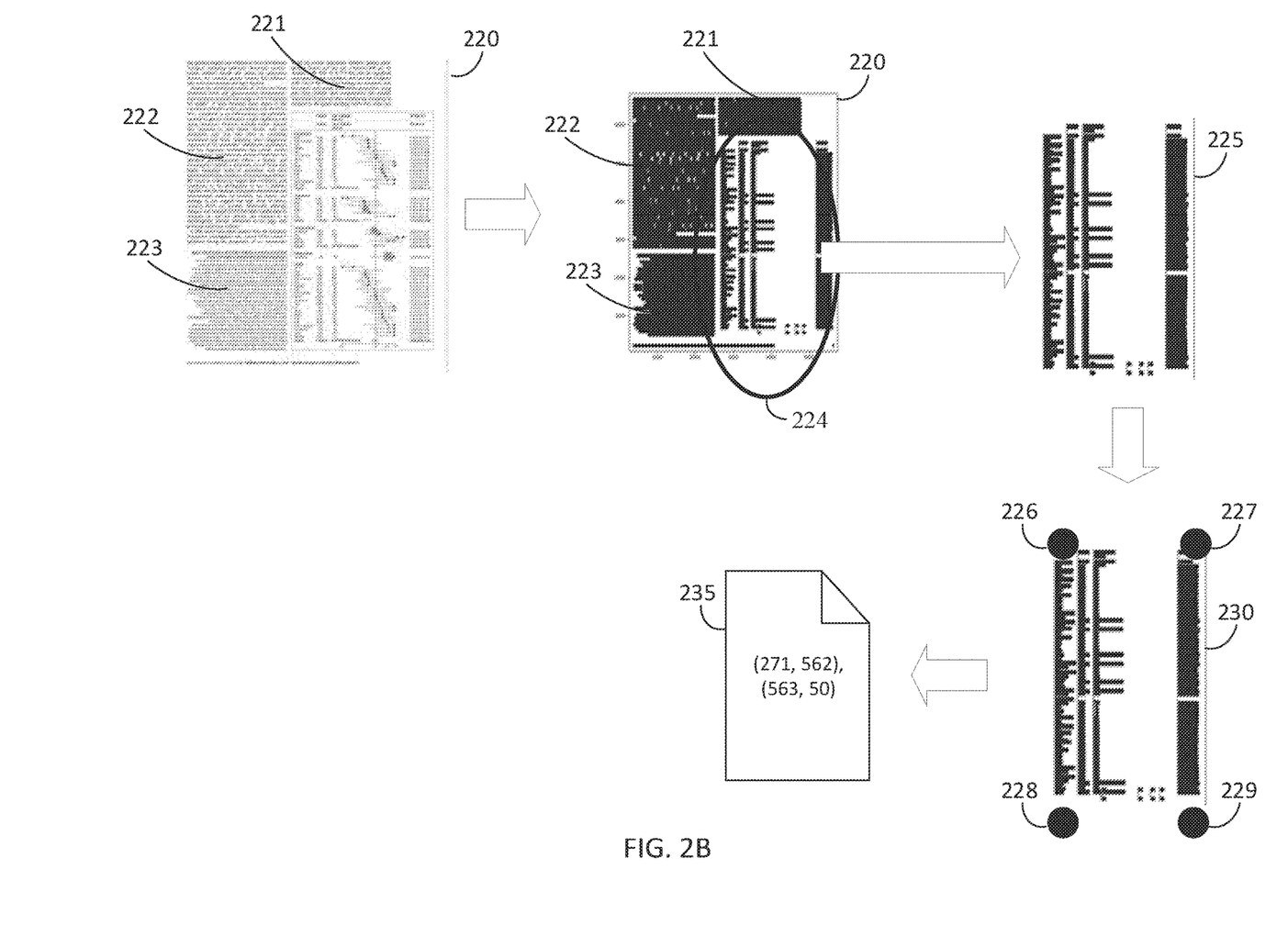
FIG. 2B is a high-level process flow of finding the coordinates based on the density clusters of pixel map illustrating document processing component in accordance with an embodiment of the present invention.

FIG. 2B is a high-level process flow of finding the coordinates based on the density clusters of a pixel map illustrating a document processing component in accordance with an embodiment of the present invention.

Figure 2C:
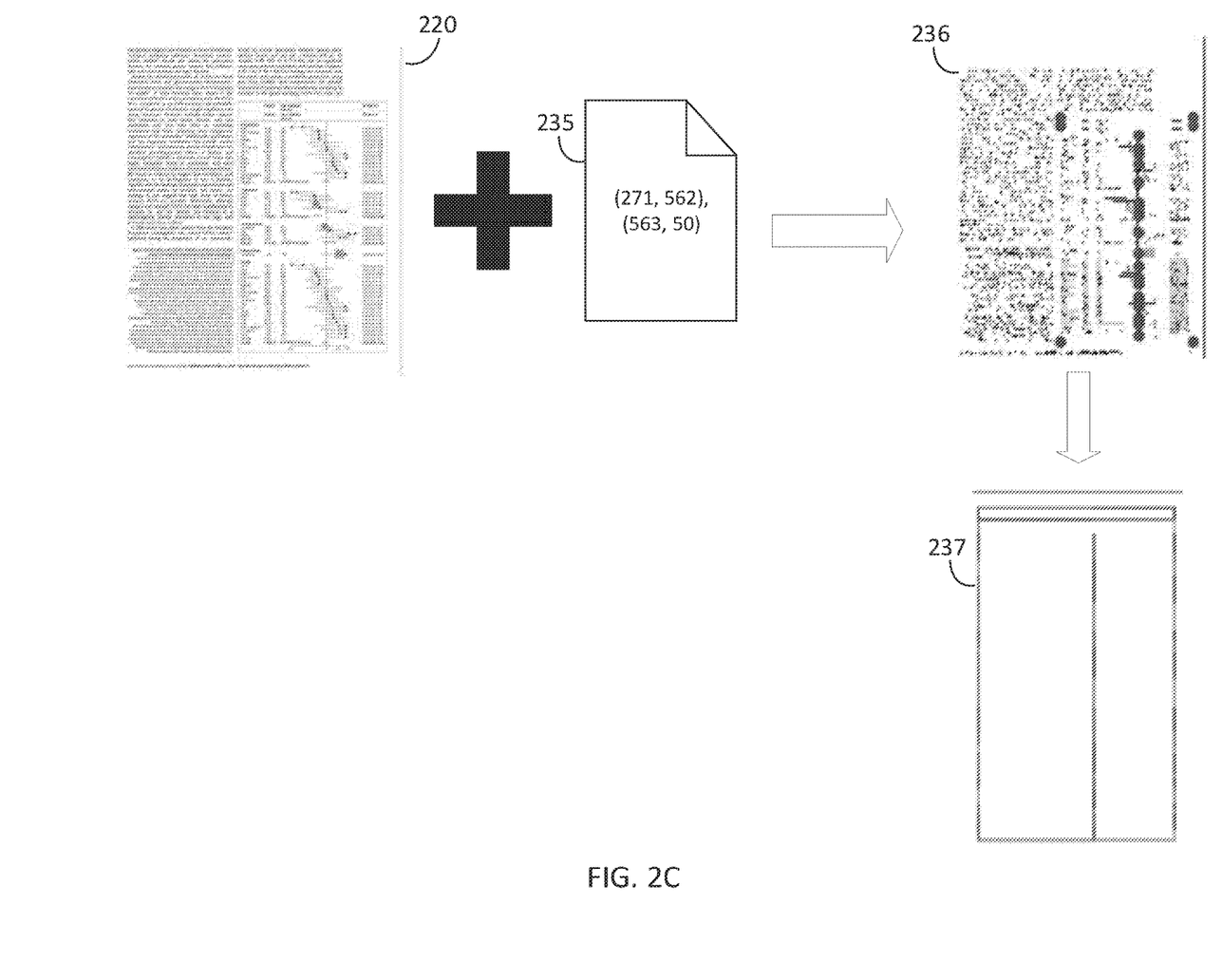
FIG. 2C is a high level process flow of backfilling the coordinates into the original document illustrating document processing component in accordance with an embodiment of the present invention.

FIG. 2C is a high-level process flow of backfilling the coordinates into the original document illustrating a document processing component in accordance with an embodiment of the present invention.

Figure 2D:
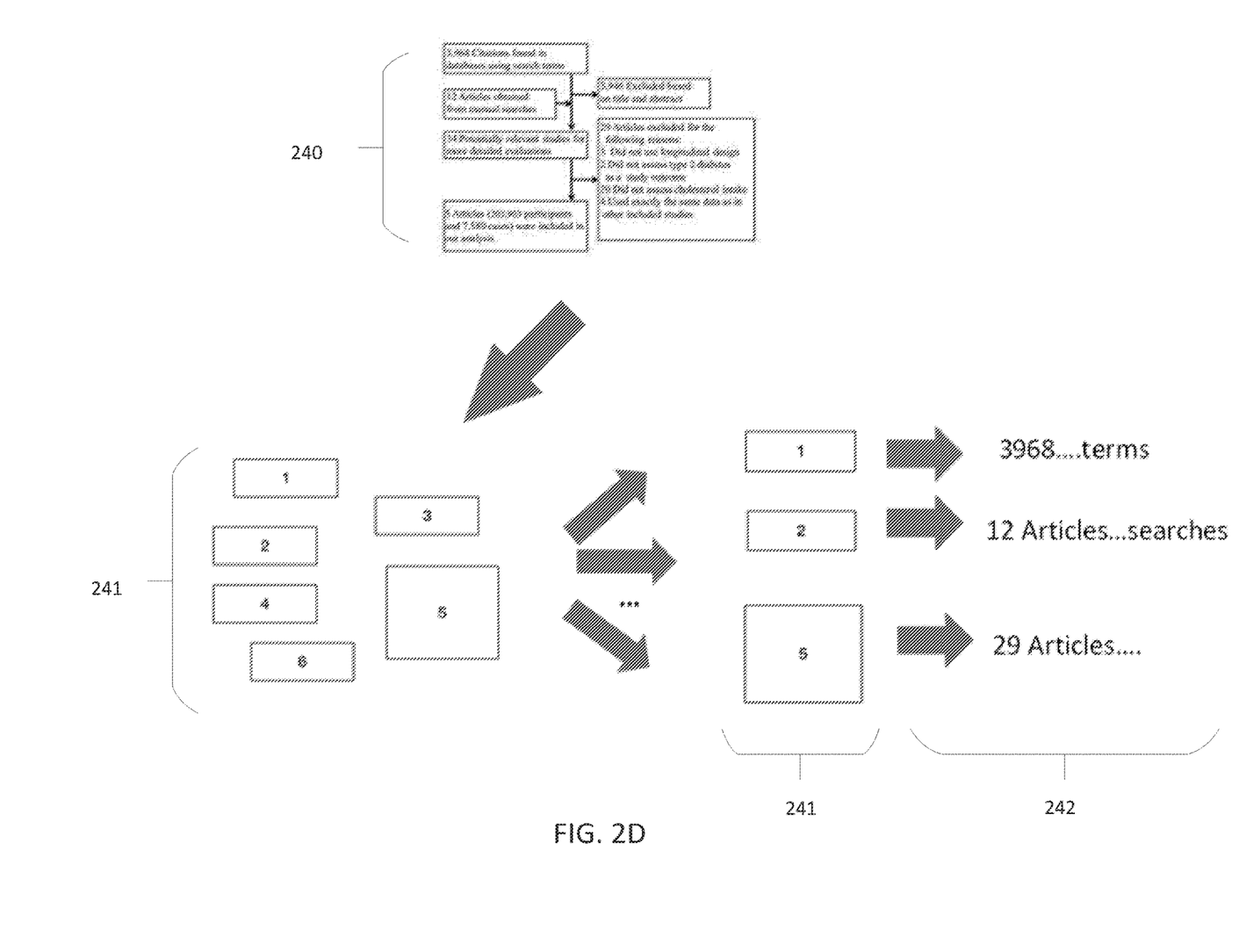
FIG. 2D is a high level process flow of extraction from a targeting multiple cells of the candidate region information after backfilling the coordinates illustrating document processing component in accordance with an embodiment of the present invention.

FIG. 2D is a high-level process flow of extraction from targeting multiple cells of the candidate region information after backfilling the coordinates illustrating a document processing component in accordance with an embodiment of the present invention.

As is further described herein below, pixilation component 212, of the present invention provides the capability of converting a document into pixels (either to be used in the digital domain or as a digital file) using existing known techniques (e.g., Optical Character Recognition, Connectionist Text Proposal Network, etc.). For example, pixilation component 212 converts original file 220 (i.e., pdf file) into a pixilation format (e.g., raster, vectors, bitmaps, etc.) to be used in the next sequence of text extraction. In another example, pixilation component 212 outputs a pixel map of the file (i.e., digital representation of the original document). In yet another example, referring to FIG. 2B, pixilation component 212 ignores textual areas (e.g., text one 221, text two 222, text three 223) of the file (i.e., original file 220). Pixilation component 212 converts the remaining non-textual area (i.e., non-text 224) into a pixel map (i.e., pixel map area 225).

As is further described herein below, density component 213, of the present invention provides the capability of creating density mapping based on the pixel conversion by pixilation component 212. Furthermore, after the document is converted into pixels, density component 213 creates a pixel density mapping in the digital domain (i.e., memory instead of outputting as a file) based on the pixel representation. Each pixel is expanded, so that the point of the image density with relatively strong connection tendency can be connected in one piece. After the pixel map file is obtained/created, density component 213 determines the center of the entire pixel density map and use the center as a starting point to aggregate the image pixel map into several density clusters, leveraging image clustering techniques (such as supervised and unsupervised machine learning). After leveraging image clustering method, density component 213 determines the minimum density. The minimum density is based on a user-selectable and/or AI learned minimum density threshold (e.g., less than 10% of original pixel density, less than 30% of original pixel density, etc.). Supervised approach such as minimum-distance-to-mean, parallelepiped and Gaussian maximum likelihood classifiers. Unsupervised approach, the classes are unknown, and the approach are categorized into two groups: hierarchical and partitional algorithm. Hierarchical clustering uses an output tree showing sequence of clustering with each cluster being a partition of the data set. Partitional clustering partitions the data base into specified number of clusters such as K-means approach.

As is further described herein below, coordinate component 214 of the present invention provides the capability of determining calibrated coordinates based on density cluster map 230. Coordinate component 214 deletes density clusters according to the distance threshold (i.e., user adjustable threshold) and density threshold until the pixel density in the graph (density cluster map 230) is reduced to one half of the original density and/or distance. It is noted that the density threshold is a user and/or AI adjustable threshold (e.g., ½, ⅓, ¼, etc.). It is noted that the distance threshold is a user and/or AI adjustable threshold (e.g., ½, ⅓, ¼, etc.) of the original distance between the density clusters. The remaining density clusters (referring to cluster one 226, cluster two 227, cluster three 228 and cluster four 229 from FIG. 2B) are then calibrated to find the coordinates of their pixels in the original file. It is noted that calibrated or calibration of density clusters means that some of density clusters not meeting the threshold (i.e., density and distance) have been deleted from the analysis (by coordinate component 214). Thus, the coordinates of the remaining density clusters are identified. The coordinates (i.e., calibrated coordinates 235) are determined by the calibration process. For example, referring to FIG. 2B, there are four remaining clusters after the calibration process: cluster one 226, cluster two 227, cluster three 228 and cluster four 229. Cluster one 226 has a X-Y coordinate of 271 and 562, respectively. Cluster two 227 has a X-Y coordinate of 563 and 562, respectively. Cluster three 228 has a X-Y coordinate 271 and 50, respectively. Cluster four 229 has a X-Y coordinate of 563 and 50, respectively. It is further noted that either machine learning or a user can set a preset value for the density threshold and distance threshold. Both thresholds can be dynamically updated/edited through the iterations based on machine learning or by the user.

As is further described herein below, candidate information region component 215, of the present invention provides the capability of determining a candidate information region of the non-textual data area. The candidate information area is the precise area where the valid information is located (i.e., candidate region information cells 240). This area does not contain invalid information. Candidate information region component 215 retrieves calibrated coordinates 235 and superimposes the coordinate back into the original data file (i.e., superimposed coordinates 236). Any coordinate-based image/data processing techniques can be used to superimpose the coordinates back into the original file (most image and pdf files supports coordinates and/or vectors). Candidate information region component 215 determined candidate region area 237 after superimposing the original coordinate back into original file 220.

As is further described herein below, extraction component 216, of the present invention provides the capability of analyzing and determining targeted areas/regions from identified candidate region area 237 for textual extraction. Extraction component 216 uses several extraction techniques, such as type identification and edge detection, on candidate region area 237. Type identification is an image processing technique and mainly detects the type of detection area (e.g., excel table type, UML diagram, etc.). Edge detection is an image processing technique for finding boundaries of objects within an image (e.g., pixel map, etc.). Edge detection is typically used for image segmentation and data extraction in areas such as image processing. After candidate information region component 215 has recognized the candidate region area 237, extraction component 216 recognize that there are several candidate information region cells 240 (FIG. 2D). Extraction component 216 divide candidate information region cells 240 into individual cells and determines the relative position of the cell and/or contents. Relative position refers to the coordinate position of the area containing valid information in the page. Generally, two sets of coordinates can determine a rectangular area as the identified sub-area. Furthermore, after the cells are identified then the extraction of data from the cells can commence. For example, (referring to FIG. 2D) extraction component 216 analyzes candidate region area 237 and using edge and/or type detection determines that there are five areas (i.e., five cells 241) that contains valid data for extraction. Extraction component 216 identifies the data type contained in the five cells (i.e., five cells 241) and converts each cell into meaningful textual data (i.e., extracted text data 242 of FIG. 2D). Any existing OCR (optical character recognition) enhance with neural network or machine learning techniques (e.g., Long et al, encoder-decoder model) known can be used to extract textual data from the cells. For example, if it is a table type, a "table method" (e.g., TableNet, etc.) extraction is used. If it is a UML graph type, UML "graph extraction" method is used. In another embodiment, if there is a document that contains both UML and Excel, sub-regions containing UML and containing Excel will be recognized.

In another embodiment of, extraction component 216, after extracting textual-data, can output the data to the users in a various formats (e.g., text document, word document, pdf format, etc.).

In other embodiments, the capability of document process component 111 can be summarized by the following phases: i) pixilation and ii) extraction. For example, during the pixilation process, document process component 111 ignore all the semantic information in the file, convert it to pixels, and get the pixel density distribution of the entire file. After obtaining the pixel density distribution map, each pixel is appropriately expanded, so that the points of the image density map with relatively strong connection tendency can be connected into one piece. After obtaining the pixel map of the file, first determine the density center of the entire density map, then use this as a starting point to aggregate the image pixel map into several density clusters according to the image clustering method to determine the minimum density. After clustering, the density clusters in the graph are deleted according to the distance and density until the pixel density in the graph is reduced to half of the original density. The remaining density clusters are then calibrated to find the coordinates of their pixels in the original file.

During the extraction phase, document processing component 111 determines the coordinates: After the coordinates of the region of the information to be extracted are obtained, the obtained coordinates are backfilled into the original file to obtain the candidate information region. Then, through the type identification, edge detection and relative position recognition of the candidate region, the type information of the candidate region is obtained, and the candidate region is divided into cells, the relative position is determined, and finally the data of the candidate region is accurately analyzed according to different data types.

Figure 3:
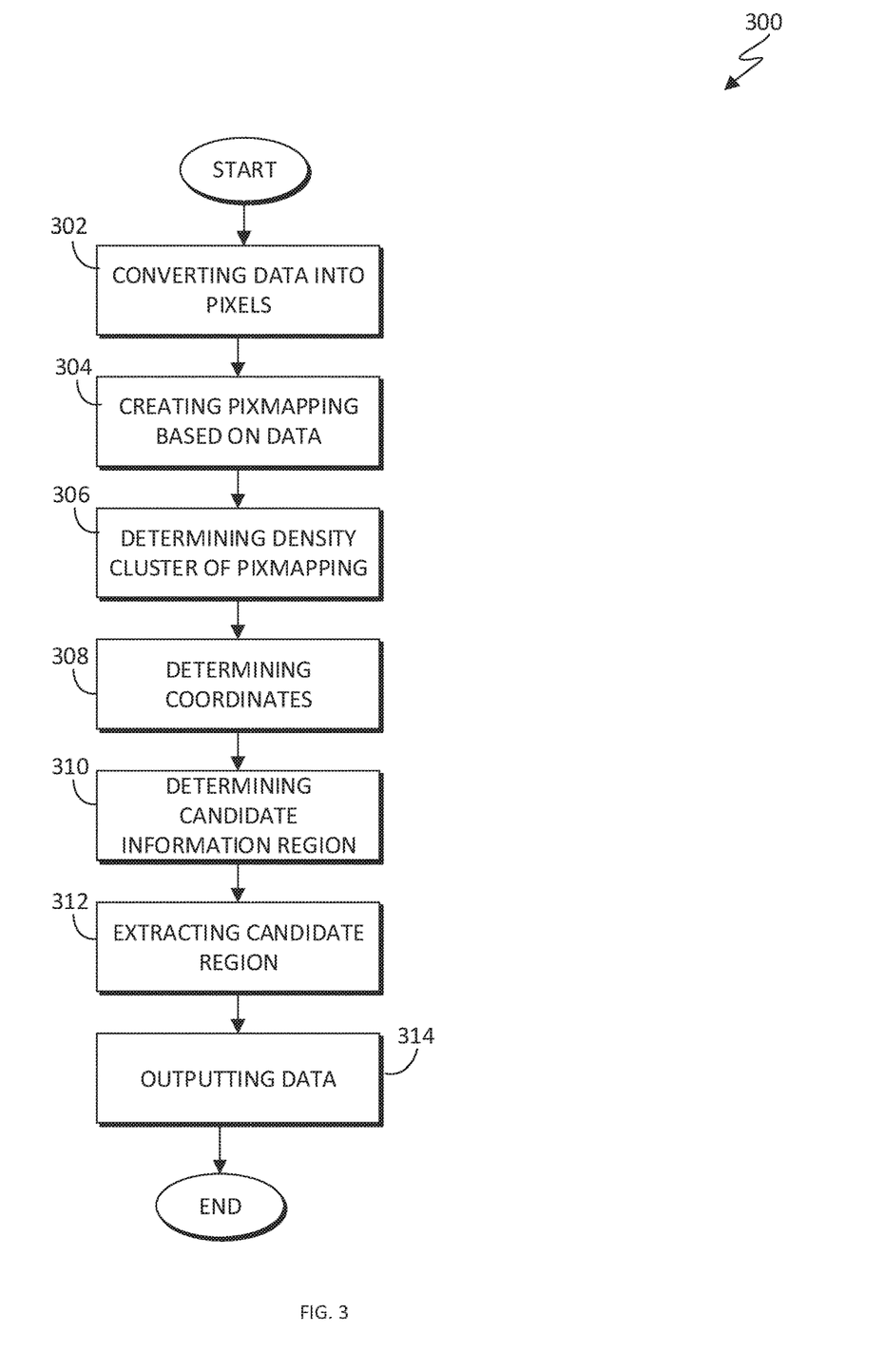
FIG. 3 is a flowchart illustrating the operation of document processing component 111, designated as 300, in accordance with an embodiment of the present invention.

FIG. 3 is a flowchart illustrating an alternative operation of document processing environment 100, designated as 300, in accordance with another embodiment of the present invention. Furthermore, an example from FIGS. 2B, 2C and 2D will be used to illustrate the flowchart steps.

Document processing component 111 converts a file into pixels (step 302). In an embodiment, document processing component 111, through pixilation component 212, converts the file into pixels and outputs into a pixel file (i.e., digital representation of the original file). For example, document processing component 111 converts original file 220 (ignoring text 221-223) into a pixel digital representation (FIG. 2B).

Document processing component 111 creates a pixel map (step 304). In an embodiment, document processing component 111, through pixilation component 212, creates a pixel map (i.e., pixel map 225 of FIG. 2B).

Document processing component 111 determines density clustering of the pixel map (step 306). In an embodiment, document processing component 111, through density component 213, determines the density center of the entire density of the pixel map. Furthermore, document processing component 111 can aggregate the image pixel map into several clusters based on a threshold to determine the minimum density.

Document processing component 111 determines coordinates (step 308). In an embodiment, document processing component 111, through coordinate component 214, determines coordinates of the pixel map. For example, coordinate component 214 reduces the pixel density of pixel map 225 to half of the original density. The remaining density clusters (i.e., density cluster map 230) are then calibrated to find the coordinates (226-229) of the pixels in the original file.

Document processing component 111 determines candidate information region (step 310). In an embodiment, document processing component 111, through candidate information region component 215, the calibrated coordinates (235) are backfilled into original file 220 to determine the candidate information region.

Document processing component 111 extract candidate information region (step 312). In an embodiment, document processing component 111, through extraction component 215, extract textual data from the candidate information region.

Document processing component 111 outputs text (step 314). In an embodiment, document processing component 111, outputs the result of the text conversion as a digital file.

Figure 4:
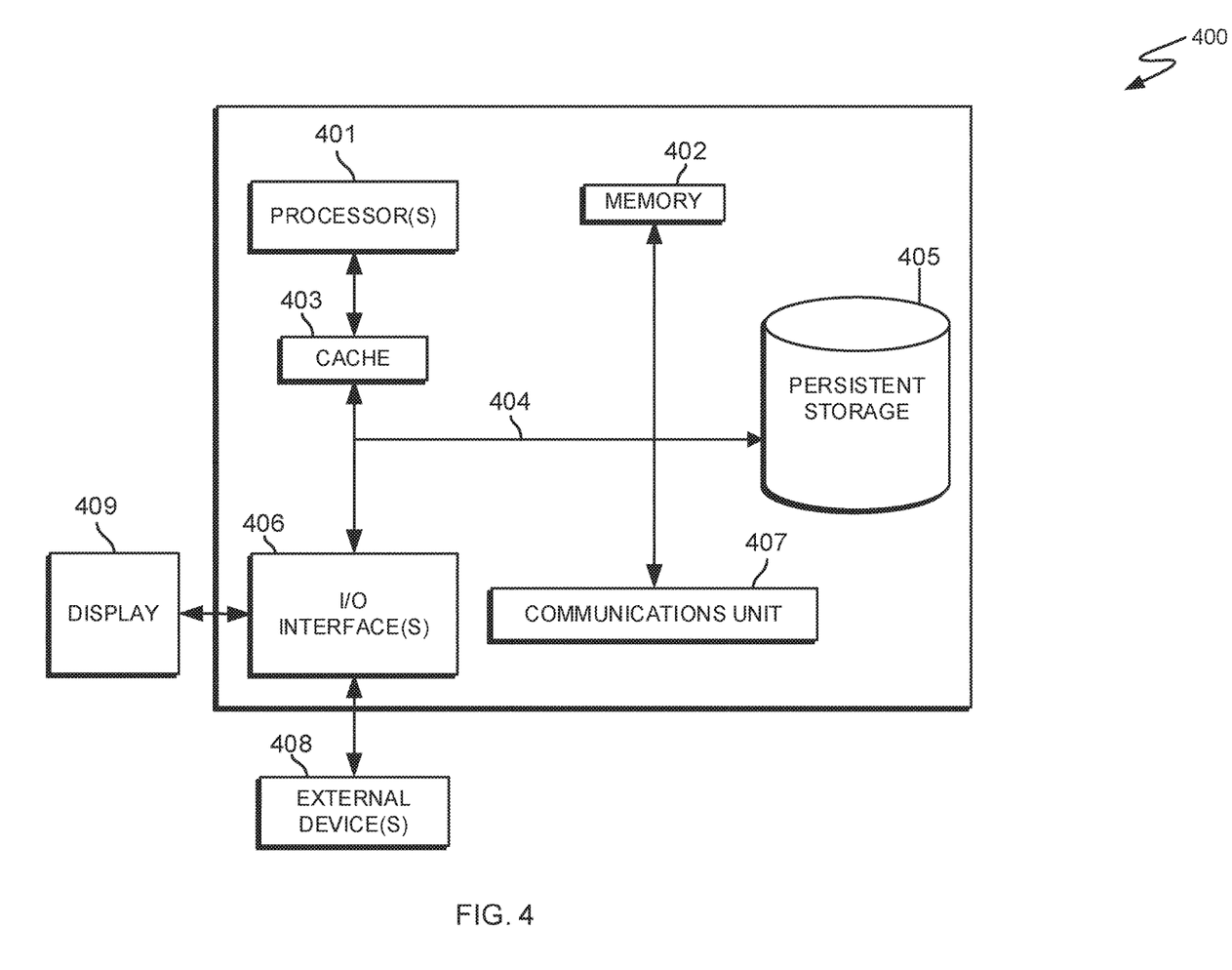
FIG. 4 depicts a block diagram, designated as 400, of components of a server computer capable of executing the document processing component 111 within the document processing environment, of FIG. 1, in accordance with an embodiment of the present invention.

FIG. 4, designated as 400, depicts a block diagram of components of document processing component 111 application, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

FIG. 4 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and datax 10) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Document processing component 111 can be stored in persistent storage 405 for access and/or execution by one or more of the respective processor(s) 401 via cache 403.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., document processing component 111) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., document processing component 111) used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed:

1. A computer-implemented method for extracting non-textual data from an electronic document, the computer-implemented method comprising:
   receiving a request to extract a file, wherein the file is the electronic document;
   converting the file into pixels;
   creating a pixel map of the converted file;
   determining one or more density clusters of the pixel map based on image clustering method;
   determining one or more coordinates of the one or more density clusters further comprises:
      determining whether the one or more density clusters exceeds a distance threshold and a density threshold;
      responsive to the one or more density clusters exceeding the distance threshold and the density threshold, deleting the one or more density clusters until a pixel density is reduced to half of an original density of the one or more density clusters; and
      determining the remaining one or more density clusters, wherein one or more coordinates of the remaining one or more density clusters is located from the file;
   determining one or more candidate information regions based on the one or more coordinates, density of the one or more density clusters;
   extracting one or more textual data based on the one or more candidate information regions; and
   outputting the extracted one or more textual data.

2. The computer-implemented method of claim 1, wherein creating the pixel map of the converted file comprise:
   converting the file without semantic information into pixels;
   determining the pixel density distribution of the file; and
   creating a pixel density distribution map.

3. The computer-implemented method of claim 1, wherein determining the one or more density clusters comprise:
   determining a first density of the pixel map, wherein the first density is located at a center of the pixel map; and
   determining a second and a third density away from the first density based on image cluster technique.

4. The computer-implemented method of claim 1, wherein determining one or more candidate information regions based on the one or more coordinates comprise:
   superimposing the determined one or more coordinates back into the file as a candidate region coordinates; and
   identifying the one or more candidate information regions based on the candidate region coordinates.

5. The computer-implemented method of claim 1, wherein extracting one or more textual data based on the one or more candidate information regions comprise:
   counting the candidate region information regions;
   creating one or more cells based on the count of the candidate region information regions; and
   converting the one or more cells into textual information.

6. The computer-implemented method of claim 1, wherein outputting the extracted one or more textual data comprise:
   sending the one or more textual data to the one or more users as an electronic format, the electronic format comprises of pdf file, word file and text file.

7. A computer program product for extracting non-textual data from an electronic document, the computer program product comprising:
   one or more computer readable storage media and program instructions stored on the one or more computer readable storage media, the program instructions comprising:
   program instructions to receive a request to extract a file, wherein the file is the electronic document;
   program instructions to converting the file into pixels;
   program instructions to create a pixel map of the converted file;
   program instructions to determine one or more density clusters of the pixel map based on image clustering method;
   program instructions to determine one or more coordinates of the one or more density clusters further comprises:
      program instructions to determine whether the one or more density clusters exceeds a distance threshold and a density threshold;
      responsive to the one or more density clusters exceeding the distance threshold and the density threshold, program instructions to delete the one or more density clusters until a pixel density is reduced to half of an original density of the one or more density clusters; and program instructions to determine the remaining one or more density clusters, wherein one or more coordinates of the remaining one or more density clusters is located from the file;

program instructions to determine one or more candidate information regions based on the one or more coordinates, density of the one or more density clusters;

program instructions to extract one or more textual data based on the one or more candidate information regions; and program instructions to output the extracted one or more textual data.

8. The computer program product of claim 7, wherein program instructions to create the pixel map of the converted file comprises:

program instructions to convert the file without semantic information into pixels;

program instructions to determine the pixel density distribution of the file; and program instructions to create a pixel density distribution map.

9. The computer program product of claim 7, wherein program instructions to determine the one or more density clusters comprises:

program instructions to determine a first density of the pixel map, wherein the first density is located at a center of the pixel map; and program instructions to determine a second and a third density away from the first density based on image cluster technique.

10. The computer program product of claim 7, wherein program instructions to determine the one or more candidate information regions based on the one or more coordinates comprise:

program instructions to superimpose the determined one or more coordinates back into the file as a candidate region coordinates; and program instructions to identify the one or more candidate information regions based on the candidate region coordinates.

11. The computer program product of claim 7, wherein program instructions to extract one or more textual data based on the one or more candidate information regions comprise:

program instructions to count the candidate region information regions;

program instructions to create one or more cells based on the count of the candidate region information regions; and program instructions to convert the one or more cells into textual information.

12. The computer program product of claim 7, wherein program instructions to output the extracted one or more textual data comprise:

program instructions to send the one or more textual data to the one or more users as an electronic format, the electronic format comprises of pdf file, word file and text file.

13. A computer system for extracting non-textual data from an electronic document, the computer system comprising:

one or more computer processors;
one or more computer readable storage media;

program instructions stored on the one or more computer readable storage media for execution by at least one of the one or more computer processors, the program instructions comprising:

program instructions to receive a request to extract a file, wherein the file is the electronic document;

program instructions to converting the file into pixels;

program instructions to create a pixel map of the converted file;

program instructions to determine one or more density clusters of the pixel map based on image clustering method;

program instructions to determine one or more coordinates of the one or more density clusters further comprises:

program instructions to determine whether the one or more density clusters exceeds a distance threshold and a density threshold;

responsive to the one or more density clusters exceeding the distance threshold and the density threshold, program instructions to delete the one or more density clusters until a pixel density is reduced to half of an original density of the one or more density clusters; and program instructions to determine the remaining one or more density clusters, wherein one or more coordinates of the remaining one or more density clusters is located from the file;

program instructions to determine one or more candidate information regions based on the one or more coordinates, density of the one or more density clusters;

program instructions to extract one or more textual data based on the one or more candidate information regions; and program instructions to output the extracted one or more textual data.

14. A computer system of claim 13, wherein program instructions to determine the one or more density clusters comprises:

program instructions to determine a first density of the pixel map, wherein the first density is located at a center of the pixel map; and program instructions to determine a second and a third density away from the first density based on image cluster technique.

15. The computer system of claim 13, wherein program instructions to determine the one or more candidate information regions based on the one or more coordinates comprise:

program instructions to superimpose the determined one or more coordinates back into the file as a candidate region coordinates; and program instructions to identify the one or more candidate information regions based on the candidate region coordinates.

16. The computer system of claim 13, wherein program instructions to extract one or more textual data based on the one or more candidate information regions comprise:

program instructions to count the candidate region information regions;

program instructions to create one or more cells based on the count of the candidate region information regions; and program instructions to convert the one or more cells into textual information.

17. The computer system of claim 13, wherein program instructions to output the extracted one or more textual data comprise:
   program instructions to send the one or more textual data to the one or more users as an electronic format, the electronic format comprises of pdf file, word file and text file.

* * * * *